US008717524B2

(12) United States Patent
Yonemura et al.

(10) Patent No.: US 8,717,524 B2
(45) Date of Patent: *May 6, 2014

(54) LIQUID CRYSTAL DISPLAY DEVICE AND METHOD OF MANUFACTURING THE SAME

(75) Inventors: Koji Yonemura, Tokyo (JP); Yasuhiro Morii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 13/489,837

(22) Filed: Jun. 6, 2012

(65) Prior Publication Data

US 2012/0249913 A1     Oct. 4, 2012

Related U.S. Application Data

(62) Division of application No. 12/490,785, filed on Jun. 24, 2009, now Pat. No. 8,289,488.

(30) Foreign Application Priority Data

Jun. 30, 2008   (JP) .................................. 2008-170382

(51) Int. Cl.
*G02F 1/1343*   (2006.01)
*G02F 1/1337*   (2006.01)

(52) U.S. Cl.
USPC ......................................... 349/141; 349/129

(58) Field of Classification Search
USPC ................................................. 349/129, 141
See application file for complete search history.

(56) References Cited

U.S. PATENT DOCUMENTS

| 6,646,707 | B2 | 11/2003 | Noh et al. |
| 7,265,801 | B2 | 9/2007 | Lin |
| 7,505,095 | B2 | 3/2009 | Lin |

(Continued)

FOREIGN PATENT DOCUMENTS

| JP | 10-10522 | 1/1998 |
| JP | 10-10523 | 1/1998 |

(Continued)

OTHER PUBLICATIONS

Japanese Office Action issued Aug. 14, 2012 in Patent Application No. 2008-170382 with English Translation.

(Continued)

*Primary Examiner* — Michael Caley
(74) *Attorney, Agent, or Firm* — Oblon, Spivak, McClelland, Maier & Neustadt, L.L.P.

(57) ABSTRACT

A liquid crystal display device includes an alignment layer having an alignment direction inclined at an angle α where 0°<α<90° with respect to an extending direction of a gate line, a pixel electrode, and a common electrode placed opposite to the pixel electrode with an insulating layer interposed therebetween. One of the pixel electrode and the common electrode has a slit for generating a fringe electric field to liquid crystals with the other of the pixel electrode and the common electrode. The slit includes a first slit lying in the alignment direction or a direction perpendicular to the alignment direction, and a plurality of second slits and a plurality of third slits respectively inclined at an angle ±θ with respect to the first slit.

4 Claims, 9 Drawing Sheets

(56) References Cited

U.S. PATENT DOCUMENTS

| | | |
|---|---|---|
| 7,920,240 B2 | 4/2011 | Yonemura |
| 7,999,777 B2 | 8/2011 | Morimoto et al. |
| 8,289,488 B2 * | 10/2012 | Yonemura et al. ............ 349/141 |
| 2001/0024246 A1 | 9/2001 | Song |
| 2006/0262252 A1 | 11/2006 | Yonemura et al. |
| 2008/0143946 A1 * | 6/2008 | Wang et al. ................... 349/141 |
| 2009/0002588 A1 | 1/2009 | Lee et al. |
| 2009/0109386 A1 | 4/2009 | Chen et al. |
| 2009/0115712 A1 | 5/2009 | Morimoto et al. |
| 2009/0310072 A1 | 12/2009 | Morii et al. |
| 2010/0296042 A1 | 11/2010 | Yonemura |
| 2012/0133865 A1 | 5/2012 | Yonemura |

FOREIGN PATENT DOCUMENTS

| | | |
|---|---|---|
| JP | 10-49082 | 2/1998 |
| JP | 2002-182230 | 6/2002 |
| JP | 2004-185011 A | 7/2004 |
| JP | 2006-91870 | 4/2006 |
| JP | 2008-83388 A | 4/2008 |
| JP | 2009-115841 A | 5/2009 |
| JP | 2009-288604 A | 12/2009 |

OTHER PUBLICATIONS

Office Action issued Jul. 30, 2013, in Japanese Patent Application No. 2012-220170 with English translation of relevant part.

* cited by examiner

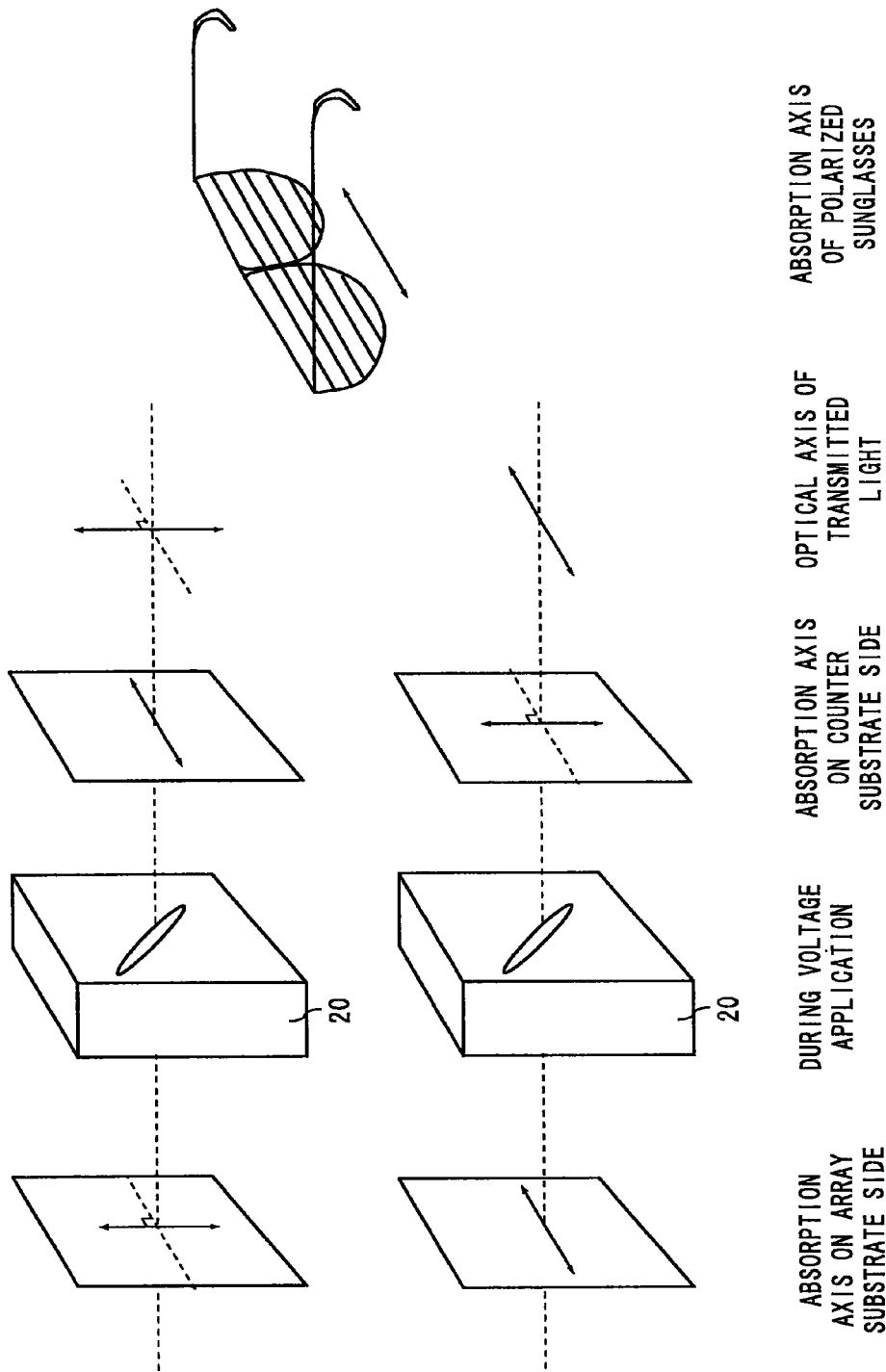
Fig. 9  RELATE ART

LIQUID CRYSTAL DISPLAY DEVICE AND METHOD OF MANUFACTURING THE SAME

CROSS-REFERENCE TO RELATED APPLICATIONS

This application is a divisional of U.S. application Ser. No. 12/490,785, filed Jun. 24, 2009, the entire content of which is incorporated herein by reference, and claims priority under 35 U.S.C. 119 to Japanese Patent Application No. 2008-170382, filed Jun. 30, 2008.

BACKGROUND OF THE INVENTION

1. Field of the Invention

The present invention relates to a liquid crystal display device and a method of manufacturing the same and, particularly, to a fringe-field switching mode liquid crystal display device and a method of manufacturing the same.

2. Description of Related Art

A fringe-field switching (FFS) mode of a liquid crystal display device is a display technique that displays an image by applying a fringe electric field to liquid crystals filled between substrates placed opposite to each other. Because a pixel electrode and a counter electrode are formed by transparent conductive layers in the FFS mode liquid crystal display device, it is possible to obtain a higher aperture ratio and transmittance compared to an in-plane switching (IPS) mode.

In liquid crystal display devices, viewing angle characteristics are degraded due to the occurrence of a phenomenon called color shift that an image looks yellowish or bluish depending on the angle of view, tone reversal or the like. Thus, the FFS mode liquid crystal display device has the structure as shown in FIG. 8 so as to suppress the color shift and the tone reversal and thereby improve the viewing angle characteristics. Referring to FIG. 8, in the FFS mode liquid crystal display device according to related art, molecules of liquid crystals 20 are oriented perpendicular to or in parallel with a gate line 43. Further, a common electrode 8 placed opposite to a pixel electrode 6 with an insulating layer interposed therebetween has slits at an angle of ±1 to 20° with respect to the orientation axis (slow axis) of the liquid crystals 20, which are symmetric about the center of a pixel. In this structure, the orientation of the liquid crystals 20 changes as indicated by the dotted line in FIG. 8 when a voltage is applied, so that the liquid crystals 20 operate symmetrically in one pixel. This prevents the birefringence effect of the liquid crystals 20 from varying depending on the oblique angle of view, thereby improving the viewing angle characteristics.

In this structure, as shown in FIG. 9, it is necessary that the absorption axis of a polarizing plate on the array substrate side is at 0° or 90° and the absorption axis of a polarizing plate on the counter substrate side is at 90° or 0°, each with respect to the orientation axis (slow axis) of the liquid crystals 20, so that they are in crossed Nichols arrangement. In this arrangement, the polarization direction (optical axis) of transmitted light that is transmitted from the FFS mode liquid crystal display device is at 0° or 90° with respect to the gate line 43.

In the case of using a liquid crystal display device outdoors, a user may watch an image through polarized sunglasses. The absorption axis of the polarized sunglasses is oriented horizontally in order to prevent reflected light from entering the eyes. Accordingly, if transmitted light from the liquid crystal display device is in the horizontal direction, the polarized sunglasses absorb the light, and a user cannot view a displayed image. Therefore, when looking at an image through the polarized sunglasses, display looks all black in either horizontal (landscape) or vertical (portrait) position.

In order to address the above concern, a technique of attaching a λ/4 plate on top of the polarizing plate is disclosed in Japanese Unexamined Patent Publication No. 10-10523. Further, a technique of attaching a polarization canceling plate that combines two quartz plates on top of the polarizing plate to thereby improve the visibility when looking at images through polarized sunglasses is disclosed in Japanese Unexamined Patent Publication No. 10-10522. Furthermore, a technique of specifying the polarization direction of the polarizing plate on the display surface side to thereby improve the visibility when looking at images through polarized sunglasses is disclosed in Japanese Unexamined Patent Publication No. 10-49082.

However, because the techniques disclosed in Japanese Unexamined Patent Publications Nos. 10-10523 and 10-10522 require an additional member such as the λ/4 plate or the polarization canceling plate, the costs increase. Further, if such a member is attached to a liquid crystal display device, the thickness of the liquid crystal display device increases. On the other hand, if the technique disclosed in Japanese Unexamined Patent Publication No. 10-49082 is used in an FFS mode liquid crystal display device, the contrast decreases.

In light of the foregoing, it is desirable to provide an FFS mode liquid crystal display device with high display quality that enables a display to be viewed in both landscape and portrait positions through polarized sunglasses without need of any additional member, and a method of manufacturing the same.

SUMMARY OF THE INVENTION

According to an embodiment of the present invention, there is provided a liquid crystal display device including a plurality of pixels, which includes a first substrate having a thin film transistor, a second substrate placed opposite to the first substrate, liquid crystals filled between the first substrate and the second substrate, alignment layers respectively placed on surfaces of the first substrate and the second substrate in contact with the liquid crystals and having an alignment direction inclined at an inclination angle $\alpha$ where $0°<\alpha<90°$ with respect to an extending direction of a gate line connected to a gate electrode of the thin film transistor, a pixel electrode placed in each pixel and connected to a drain electrode of the thin film transistor, and a common electrode placed opposite to the pixel electrode with an insulating layer interposed therebetween, one of the pixel electrode and the common electrode having a slit for generating a fringe electric field to the liquid crystals with the other of the pixel electrode and the common electrode, wherein the slit includes a first slit (which is a slit C in an embodiment of the present invention) placed in each pixel and lying in the alignment direction or a perpendicular direction to the alignment direction, a plurality of second slits (which are slits A in an embodiment of the present invention) placed in a first region on one side of the first slit in each pixel and inclined at an angle θ to a given direction with respect to a longitudinal direction of the first slit, and a plurality of third slits (which are slits B in an embodiment of the present invention) placed in a second region on another side of the first slit opposite to the first region in each pixel and inclined at the angle θ to a direction opposite to the given direction with respect to the longitudinal direction of the first slit.

According to another embodiment of the present invention, there is provided a method of manufacturing a liquid crystal display device including a plurality of pixels, which includes steps of forming a thin film transistor on a first substrate, forming a pixel electrode connected to a drain electrode of the thin film transistor in each pixel, forming a common electrode placed opposite to the pixel electrode with an insulating layer interposed therebetween, the common electrode having a slit for generating a fringe electric field with the pixel electrode, forming an alignment layer on the common electrode, the alignment layer having an alignment direction inclined at an inclination angle α where 0°<α<90° with respect to an extending direction of a gate line connected to a gate electrode of the thin film transistor, and attaching a second substrate to the first substrate and filling liquid crystals between the first substrate and the second substrate, wherein the step of forming the common electrode makes a first slit placed in each pixel and lying in the alignment direction or a perpendicular direction to the alignment direction, a plurality of second slits placed in a first region on one side of the first slit in each pixel and inclined at an angle θ to a given direction with respect to a longitudinal direction of the first slit, and a plurality of third slits placed in a second region on another side of the first slit opposite to the first region in each pixel and inclined at the angle θ to a direction opposite to the given direction with respect to the longitudinal direction of the first slit.

According to the embodiments of the present invention, it is possible to provide an FFS mode liquid crystal display device with high display quality that enables a display to be viewed in both landscape and portrait positions through polarized sunglasses without need of any additional member, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 9 is a view to describe the arrangement direction of polarizing plates in an FFS mode liquid crystal display device according to related art.

DESCRIPTION OF THE EXEMPLARY EMBODIMENTS

Figure 1:
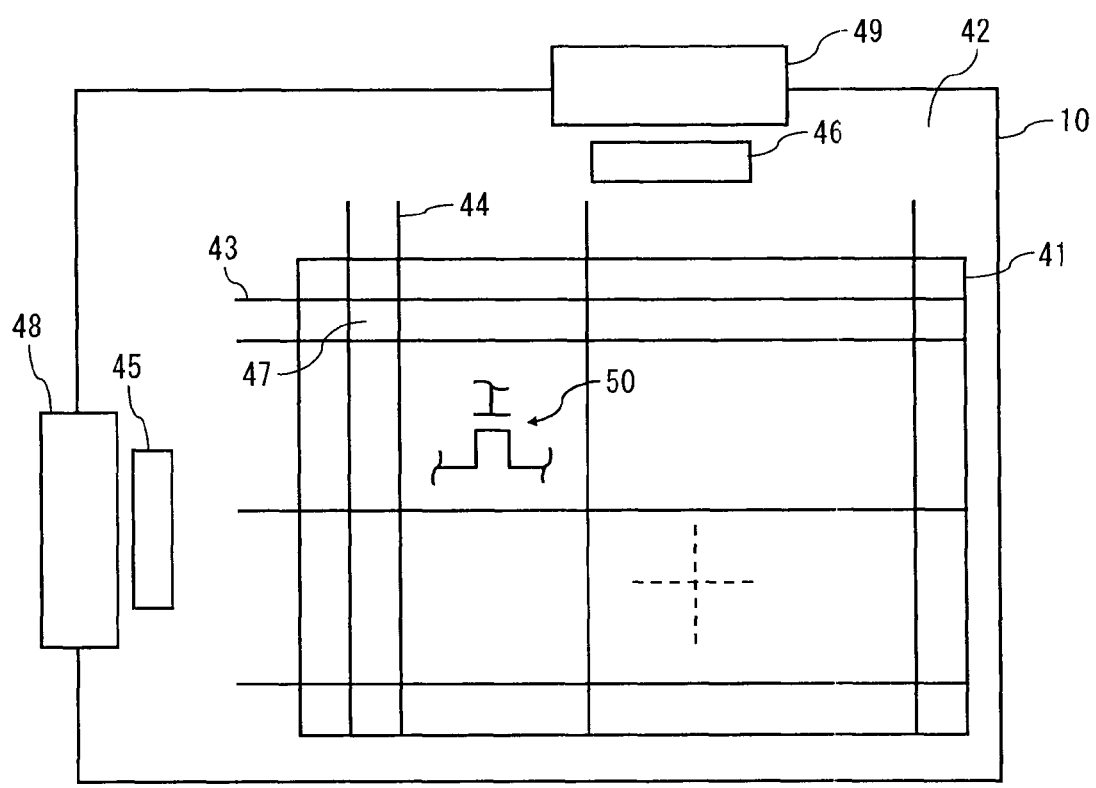
FIG. 1 is a front view showing the structure of a TFT array substrate used in a liquid crystal display device.

A liquid crystal display device according to an embodiment of the present invention is described hereinafter with reference to FIG. 1. FIG. 1 is a front view showing the structure of a thin film transistor (TFT) array substrate to be used in a liquid crystal display device. The liquid crystal display device according to the embodiment is an FFS mode liquid crystal display device in which a pixel electrode and a counter electrode are placed in the TFT array substrate.

The liquid crystal display device according to the embodiment includes a substrate 10. The substrate 10 is an array substrate such as a TFT array substrate, for example. The substrate 10 includes a display area 41 and a frame area 42 surrounding the display area 41. In the display area 41, a plurality of gate lines (scanning signal lines) 43 and a plurality of source lines (display signal lines) 44 are placed. The plurality of gate lines 43 are arranged in parallel with each other. Likewise, the plurality of source lines 44 are arranged in parallel with each other. The gate lines 43 and the source lines 44 intersect with each other. Each area surrounded by the adjacent gate lines 43 and the adjacent source lines 44 serves as a pixel 47. Thus, a plurality of pixels 47 are arranged in matrix in the substrate 10.

In the frame area 42 of the substrate 10, a scanning signal driving circuit 45 and a display signal driving circuit 46 are placed. The gate lines 43 extend from the display area 41 to the frame area 42 and are connected to the scanning signal driving circuit 45 at the end of the substrate 10. Likewise, the source lines 44 extend from the display area 41 to the frame area 42 and are connected to the display signal driving circuit 46 at the end of the substrate 10. An external line 48 is connected in the vicinity of the scanning signal driving circuit 45. Further, an external line 49 is connected in the vicinity of the display signal driving circuit 46. The external lines 48 and 49 are wiring boards such as a flexible printed circuit (FPS), for example.

External signals are supplied to the scanning signal driving circuit 45 and the display signal driving circuit 46 through the external lines 48 and 49. The scanning signal driving circuit 45 supplies a gate signal (scanning signal) to the gate lines 43 based on an external control signal. The gate lines 43 are sequentially selected by the gate signal. On the other hand, the display signal driving circuit 46 supplies a display signal to the source lines 44 based on an external control signal and display data. A display voltage according to display data is thereby supplied to each pixel 47.

Each pixel includes at least one TFT 50. The TFT 50 is placed in the vicinity of the intersection of the source line 44 and the gate line 43. For example, the TFT 50 supplies a display voltage to a pixel electrode. Specifically, the TFT 50, which is a switching element, is turned on by the gate signal from the gate line 43. A display voltage is thereby applied from the source line 44 to the pixel electrode that is connected to a drain electrode of the TFT 50. The pixel electrode is placed opposite to a common electrode (counter electrode) having slits with an insulating layer interposed therebetween. A fringe electric field corresponding to the display voltage is generated between the pixel electrode and the counter electrode. Further, an alignment layer (not shown) is placed on the surface of the substrate 10. The detailed structure of the pixel 47 is described later.

Further, a counter substrate is placed opposite to the substrate 10. The counter substrate is a color filter substrate, for example, and it is placed on the viewing side. The counter substrate is placed to face the array substrate with a cell gap of about 1 to 5 μm, for example. On the counter substrate, a black matrix (BM), a color filter, an alignment layer and so on are placed. Further, an overcoat layer or a columnar photospacer may be placed between the color filter and the alignment layer.

A liquid crystal layer is placed between the substrate 10 and the counter substrate. In other words, liquid crystals are filled between the substrate 10 and the counter substrate. In this embodiment, the liquid crystals are oriented at an angle α, which is larger than 0° and smaller than 90°, with respect to the gate line 43 when no voltage is applied. Thus, the orientation direction (slow axis) of the liquid crystals is set at the angle α, which is 0°<θ<90°, with respect to the extending direction of the gate line 43. Accordingly, the alignment layers that are placed on the respective surfaces of the substrate 10 and the counter substrate in contact with the liquid crystals have the alignment direction which is inclined at the angle α with respect to the extending direction of the gate line 43.

Figure 2:
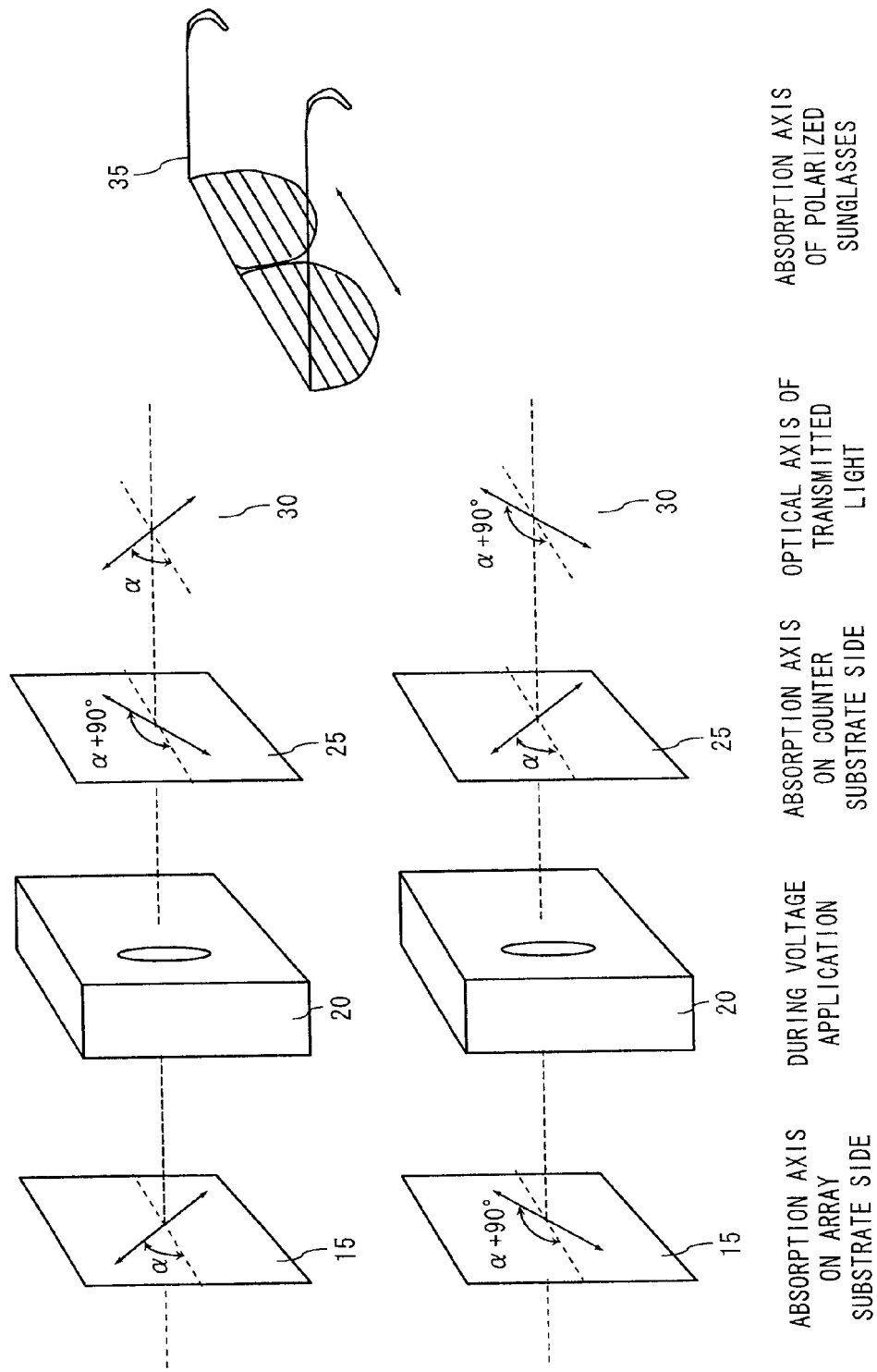
FIG. 2 is a view to describe the arrangement direction of polarizing plates according to an embodiment of the present invention.

Further, a polarizing plate, a retardation film and so on are placed on the outer sides of the substrate 10 and the counter substrate. Furthermore, a backlight unit or the like is placed on the non-viewing side of the liquid crystal display panel. In this embodiment, the absorption axis of the polarizing plate is set to be in the direction perpendicular to or in parallel with the orientation direction (slow axis) of the liquid crystals. This is described hereinafter with reference to FIG. 2. FIG. 2 is a view to describe the arrangement direction of polarizing plates according to an embodiment of the present invention. As shown in FIG. 2, if the absorption axis of a polarizing plate 15 on the array substrate side is set at the angle α with respect to the extending direction of the gate line 43, which is the direction in parallel with the orientation direction (slow axis) of the liquid crystals, the absorption axis of a polarizing plate 25 on the counter substrate side is set at the angle α+90°, so that they are in crossed Nichols arrangement. On the other hand, if the absorption axis of the polarizing plate 15 on the array substrate side is set at the angle α+90° with respect to the extending direction of the gate line 43, which is the direction perpendicular to the orientation direction (slow axis) of the liquid crystals, the absorption axis of the polarizing plate 25 on the counter substrate side is set at the angle α, so that they are in crossed Nichols arrangement. In this manner, the polarizing plates 15 and 25 have the absorption axes that are set in the orientation direction of the liquid crystals or in the direction perpendicular to the orientation direction.

The liquid crystals are driven by a fringe electric field between the pixel electrode and the counter electrode. Specifically, the orientation of the liquid crystals between the substrates changes by an applied voltage. The polarization state of light passing through the liquid crystal layer thereby changes. Specifically, the polarization state of linearly polarized light having passed through the polarizing plate changes by the liquid crystal layer. To be more precise, as shown in FIG. 2, light from the backlight unit becomes linearly polarized light by the polarizing plate 15 on the array substrate side. Then, the linearly polarized light passes through the liquid crystal layer, so that its polarization state changes.

The amount of light passing through the polarizing plate 25 on the counter substrate side varies depending on the polarization state. Specifically, among the transmitted light that is transmitted through the liquid crystal display panel from the backlight unit, the amount of light passing through the polarizing plate 25 on the viewing side varies. The orientation of liquid crystals varies depending on a display voltage to be applied. Therefore, it is possible to change the amount of light passing through the polarizing plate 25 on the viewing side by controlling the display voltage. Thus, it is possible to display a desired image by varying the display voltage for each pixel.

Transmitted light 30 that has been transmitted through the polarizing plate 25 on the counter substrate side is linearly polarized light having the optical axis at the angle α or α+90° with respect to the gate line 43. Specifically, as shown in FIG. 2, if the absorption axis of the polarizing plate 25 on the counter substrate side is set at the angle α+90° with respect to the gate line 43, the transmitted light 30 in the polarization direction at the angle α with respect to the gate line 43 is transmitted from the liquid crystal display device. On the other hand, if the absorption axis of the polarizing plate 25 on the counter substrate side is set at the angle α with respect to the gate line 43, the transmitted light 30 in the polarization direction at the angle α+90° with respect to the gate line 43 is transmitted from the liquid crystal display device. The value of the angle α is set to be 0°<α<90° with respect to the extending direction of the gate line 43, as mentioned previously. Accordingly, the polarization direction of the transmitted light 30 that is transmitted from the liquid crystal display device does not completely coincide with the horizontal direction in which the absorption axis of polarized sunglasses 35 is placed. It is thereby possible to prevent a display from looking all black in either horizontal (landscape) or vertical (portrait) position when looking at an image through the polarized sunglasses 35. This enables a user to view a display in both horizontal (landscape) and vertical (portrait) positions while wearing the polarized sunglasses 35.

Figure 3:
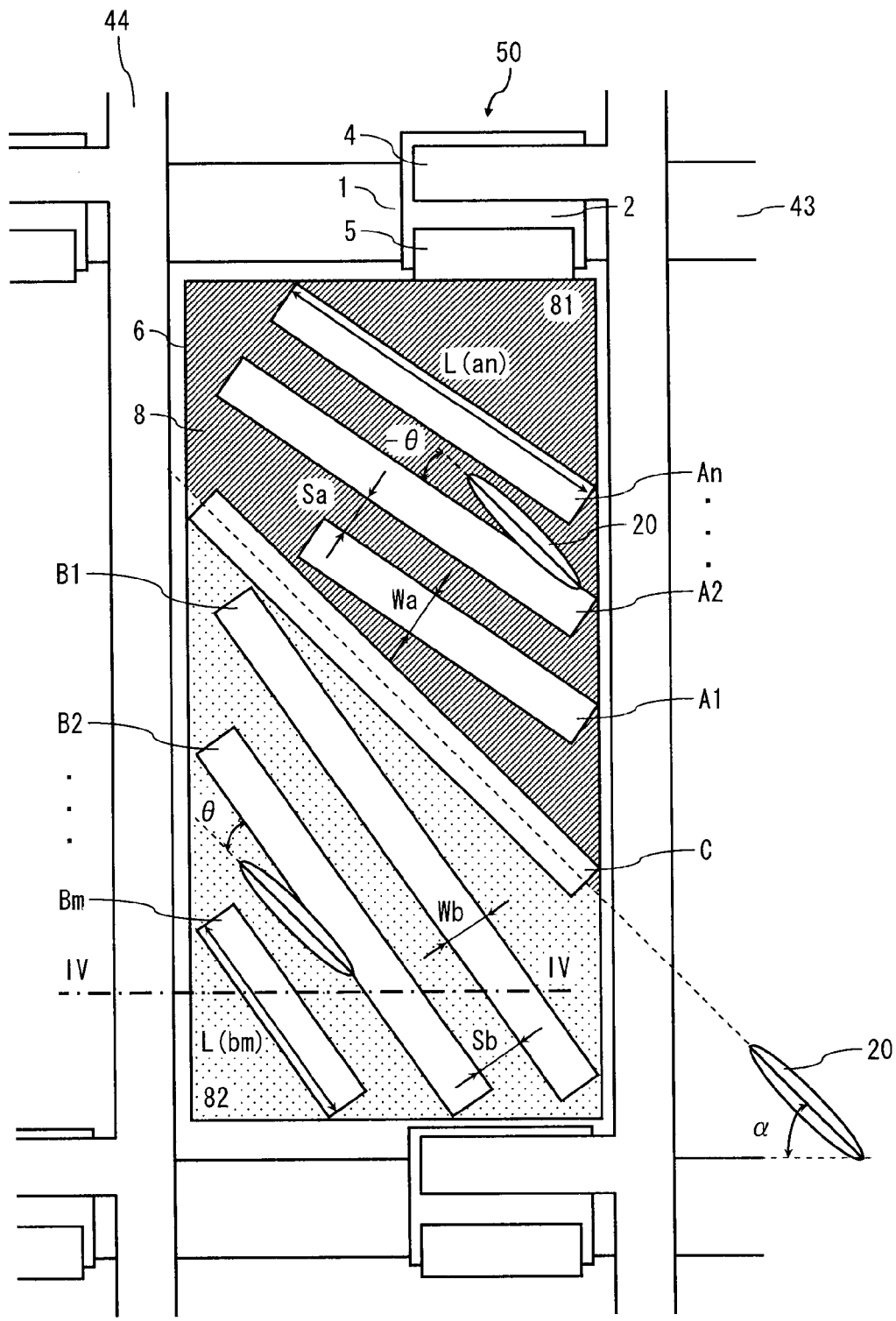
FIG. 3 is a plan view showing the pixel structure of a TFT array substrate according to an embodiment of the present invention.
Figure 4:
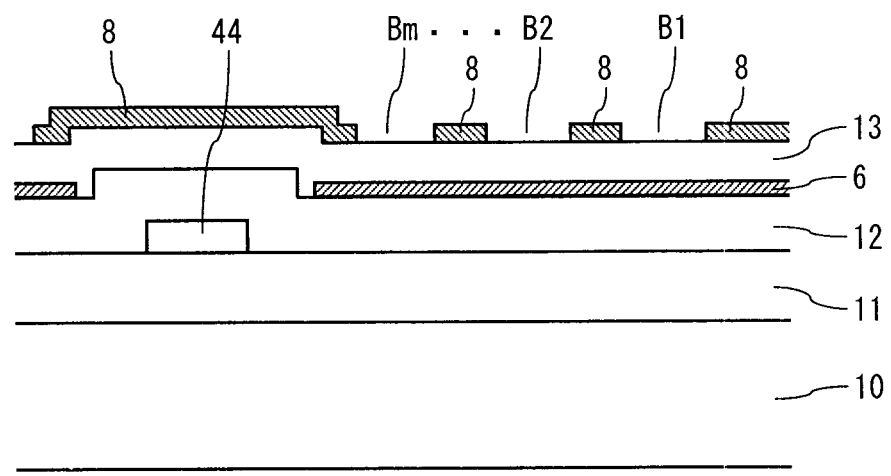
FIG. 4 is a sectional view along line IV-IV in FIG. 3.

The pixel structure of the liquid crystal display device according to an embodiment of the present invention is described hereinafter with reference to FIGS. 3 and 4. FIG. 3 is a plan view showing the pixel structure of a TFT array substrate according to an embodiment of the present invention. FIG. 4 is a sectional view along line IV-IV in FIG. 3. FIG. 3 shows one of the pixels 47 of the TFT array substrate. The structure having the channel-etch type TFT 50 is described hereinbelow by way of illustration.

Referring to FIGS. 3 and 4, the gate line 43, a part of which serves as a gate electrode 1, is placed on the transparent insulating substrate 10 such as glass. The gate line 43 extends linearly in one direction on the substrate 10. The gate electrode 1 and the gate line 43 are made of Cr, Al, Ta, Ti, Mo, W, Ni, Cu, Au or Ag, an alloy film made mainly of those or a stacked film of those, for example.

A gate insulating layer 11, which is a first insulating layer, is placed to cover the gate electrode 1 and the gate line 43. The gate insulating layer 11 is made of an insulating film such as silicon nitride or silicon oxide. Further, in the formation area of the TFT 50, a semiconductor layer 2 is placed opposite to the gate electrode 1 with the gate insulating layer 11 interposed therebetween. In this example, the semiconductor layer 2 is placed on the gate insulating layer 11 so as to overlap the gate line 43, and the part of the gate line 43 which overlaps the semiconductor layer 2 serves as the gate electrode 1. The semiconductor layer 2 is made of amorphous silicon, polycrystalline polysilicon or the like, for example.

Further, ohmic contact layers into which conductive impurity is doped are placed on both ends of the semiconductor layer 2. The parts of the semiconductor layer 2 which correspond to the ohmic contact layers are source and drain regions, respectively. Specifically, the part of the semiconductor layer 2 which corresponds to the ohmic contact layer on the upper side in FIG. 3 serves as the source region. The part of the semiconductor layer 2 which corresponds to the ohmic contact layer on the lower side in FIG. 3 serves as the drain region. In this manner, the source and drain regions are formed at the both ends of the semiconductor layer 2. The part of the semiconductor layer 2 between the source and drain regions serves as a channel region. The ohmic contact layer is not placed on the channel region of the semiconductor layer 2. The ohmic contact layer is made of n-type amorphous silicon, n-type polycrystalline silicon or the like into which impurity such as phosphorus (P) is doped at high concentration, for example.

A source electrode 4 and a drain electrode 5 are respectively placed on the ohmic contact layers. Specifically, the source electrode 4 is placed on the ohmic contact layer on the source region side. The drain electrode 5 is placed on the ohmic contact layer on the drain region side. The channel-etch type TFT 50 is formed in this manner. The source electrode 4 and the drain electrode 5 extend to the outside of the channel region of the semiconductor layer 2. Thus, like the ohmic contact layers, the source electrode 4 and the drain electrode 5 are not placed on the channel region of the semiconductor layer 2.

The source electrode 4 extends to the outside of the channel region of the semiconductor layer 2 and is connected to the source line 44. The source line 44 is placed on the gate insulating layer 11 and extends linearly in the direction intersecting the gate line 43 over the substrate 10. Thus, the source line 44 branches off at the intersection with the gate line 43 and extends along the gate line 43, to form the source electrode 4.

On the other hand, the drain electrode 5 extends to the outside of the channel region of the semiconductor layer 2. Thus, the drain electrode 5 has an extending part that extends to the outside of the TFT 50. The source electrode 4, the drain electrode 5 and the source line 44 are made of Cr, Al, Ta, Ti, Mo, W, Ni, Cu, Au or Ag, an alloy film made mainly of those or a stacked film of those, for example.

Further, a second insulating layer 12 is placed to cover the source electrode 4, the drain electrode 5 and the source line 44. The second insulating layer 12 has a contact hole (not shown) that reaches the extending part of the drain electrode 5. The second insulating layer 12 is made of an insulating film such as silicon nitride or silicon oxide.

On the second insulating layer 12, a pixel electrode 6 that is electrically connected to the drain electrode 5 through the contact hole is placed. The pixel electrode 6 is connected to the extending part of the drain electrode 5 through the contact hole. Further, the pixel electrode 6 extends from the extending part of the drain electrode 5 to the inside of the pixel 47. Specifically, as shown in FIG. 3, the pixel electrode 6 is placed substantially all over the area surrounded by the source line 44 and the gate line 43 except the TFT 50. The pixel electrode 6 is made of a transparent conductive film such as ITO.

Furthermore, a third insulating layer 13 is placed to cover the pixel electrode 6. The third insulating layer 13 is made of an insulating film such as silicon nitride or silicon oxide. Further, a common electrode 8 is placed on the third insulating layer 13. The common electrode 8 is placed opposite to the pixel electrode 6 with the third insulating layer 13 interposed therebetween. As shown in FIG. 4, the common electrode 8 has slits to generate a fringe electric field with the pixel electrode 6. In this example, the common electrode 8 is placed substantially all over the display area 41 except the slit parts. Thus, the common electrode 8 is electrically connected to the common electrodes 8 of all the adjacent pixels 47. The common electrode 8 is made of a transparent conductive film such as ITO. In FIG. 3, only the outer shape of slits is illustrated as the common electrode 8.

In this embodiment, the common electrode 8 has a plurality of slits that lie in different directions as shown in FIG. 3. Specifically, a plurality of slits A1, A2, . . . , An (which are referred to collectively as the slits A) are placed in a first region 81, which is apart of the pixel 47. Further, a plurality of slits B1, B2, . . . , Bm (which are referred to collectively as the slits B) are placed in a second region 82, which is another part of the pixel 47. Furthermore, a slit C is placed between the first region 81 and the second region 82. The slit C is located on the boundary between the first region 81 and the second region 82.

The slit C lies in the same direction as the orientation direction (slow axis) of the liquid crystal 20 when no voltage is applied or in the direction perpendicular to the orientation direction. Thus, the slit C lies in the alignment direction of the alignment layer or in the direction perpendicular to the alignment direction. Accordingly, the slit C is inclined at the angle α or α+90° with respect to the gate line 43. FIG. 3 shows the case where the slit C lies in the same direction as the orientation direction (slow axis) of the liquid crystal 20, which is the direction that is inclined at the angle α with respect to the gate line 43, by way of illustration. In each pixel 47, the part above the slit C is the first region 81, and the part below the slit C is the second region 82. Thus, the first region 81 is located on one side of the slit C, and the second region 82 is located on the other side of the slit C, which is the side opposite to the first region 81.

The slits A in the first region 81 and the slits B in the second region 82 are placed to be inclined at ±θ with respect to the slit C. Specifically, as shown in FIG. 3, the longitudinal direction of the slits B is set at the angle +θ with respect to the longitudinal direction of the slit C. Thus, the slits B are inclined to a given direction at the angle θ with respect to the longitudinal direction of the slit C. The angle θ is preferably in the range of 1° to 20°. On the other hand, the longitudinal direction of the slits A is set at the angle −θ with respect to the longitudinal direction of the slit C. Thus, the slits A are inclined to the direction opposite to the inclination direction of the slits B at the angle θ with respect to the longitudinal direction of the slit C. Accordingly, the angle of inclination of the slits A with respect to the slit C is symmetric to the angle of inclination of the slits B with respect to the slit C about the longitudinal direction of the slit C. By placing the slits A and B in such an inclined manner, the liquid crystals 20 can operate symmetrically about the slit C in one pixel 47. This allows the birefringence effect to be symmetric in the first region 81 and the second region 82. It is thereby possible to prevent color shift from occurring when viewing an image from different angles, thus obtaining suitable viewing angle characteristics.

The angle of inclination of the slits A and the angle of inclination of the slits B with respect to the slit C may be opposite. Specifically, the slits A may be inclined at the angle +θ and the slits B may be inclined at the angle −θ with respect to the slit C. Accordingly, one of the slits A and the slits B is inclined at the angle +θ and the other one is inclined at the angle −θ, where 1°≤θ≤20°, with respect to the slit C. A difference in the angle of inclination between the slits A and the slits B is 2θ.

The plurality of slits A1, A2, . . . , An are arranged in parallel with each other in the first region 81. The plurality of slits B1, B2, . . . , Bm are also arranged in parallel with each other in the second region 82. The plurality of slits A1, A2, . . . , An are arranged at a regular interval Sa. The plurality of slits B1, B2, . . . , Bm are arranged at a regular interval Sb, which is equal to the interval Sa. Generally, the intervals Sa and Sb are preferably in the range of 1 to 10 μm.

The plurality of slits A1, A2, . . . , An have a fixed slit width Wa. The slits A1, A2, . . . , An have slit lengths L(a1), L(a2), . . . , L(an), respectively. It is not necessary that all of the slit lengths L(a1), L(a2), . . . , L(an) have the same value. Likewise, the plurality of slits B1, B2, . . . , Bm have a fixed slit width Wb. The slits B1, B2, . . . , Bm have slit lengths L(b1), L(b2), . . . , L(bm), respectively. It is not necessary that all of the slit lengths L(b1), L(b2), ..., L(bm) have the same value. In this embodiment, it is preferred that the respective slit lengths are adjusted in such a way that a total slit length L(A)=L(a1)+L(a2)+ ... +L(an) of the slits A is the same as a total slit length L(B)=L(b1)+L(b2)+ ... +L(bm) of the slits B.

Figure 5:
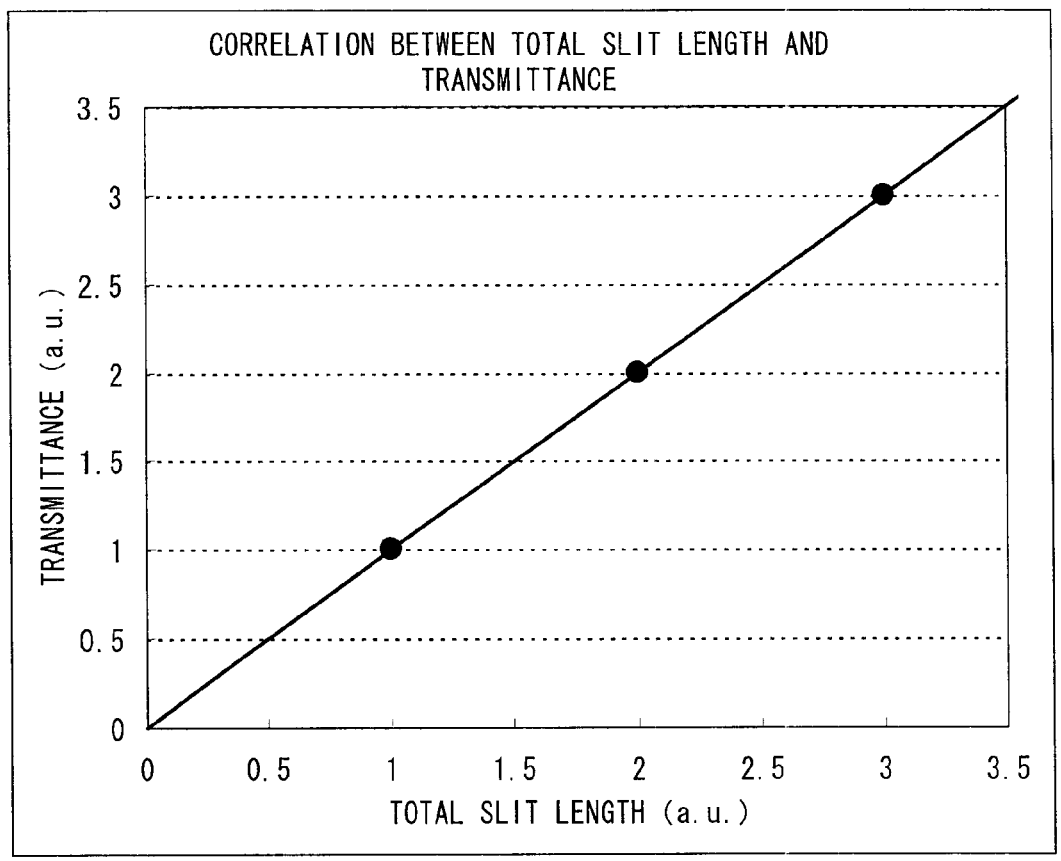
FIG. 5 is a graph showing the relationship between a total slit length when a slit width is fixed and transmittance per unit area when viewed from the front.

By making the slits so as to satisfy L (A)=L(B), the operating region of the liquid crystals 20 is equalized between the first region 81 and the second region 82. This is described hereinbelow. FIG. 5 is a graph showing the relationship between a total slit length when a slit width is fixed and transmittance per unit area when viewed from the front. As shown in FIG. 5, the total slit length and the transmittance are in a proportional relationship. Thus, the operating region of the liquid crystals 20 is proportional to the total slit length. Therefore, by equalizing the total slit length L(A) of the slits A in the first region 81 and the total slit length L(B) of the slits B in the second region 82, the operating region of the liquid crystals 20 is the same between the first region 81 and the second region 82. It is thereby possible to prevent color shift from occurring when viewing an image from different angles more reliably, thus obtaining more suitable viewing angle characteristics.

Figure 6:
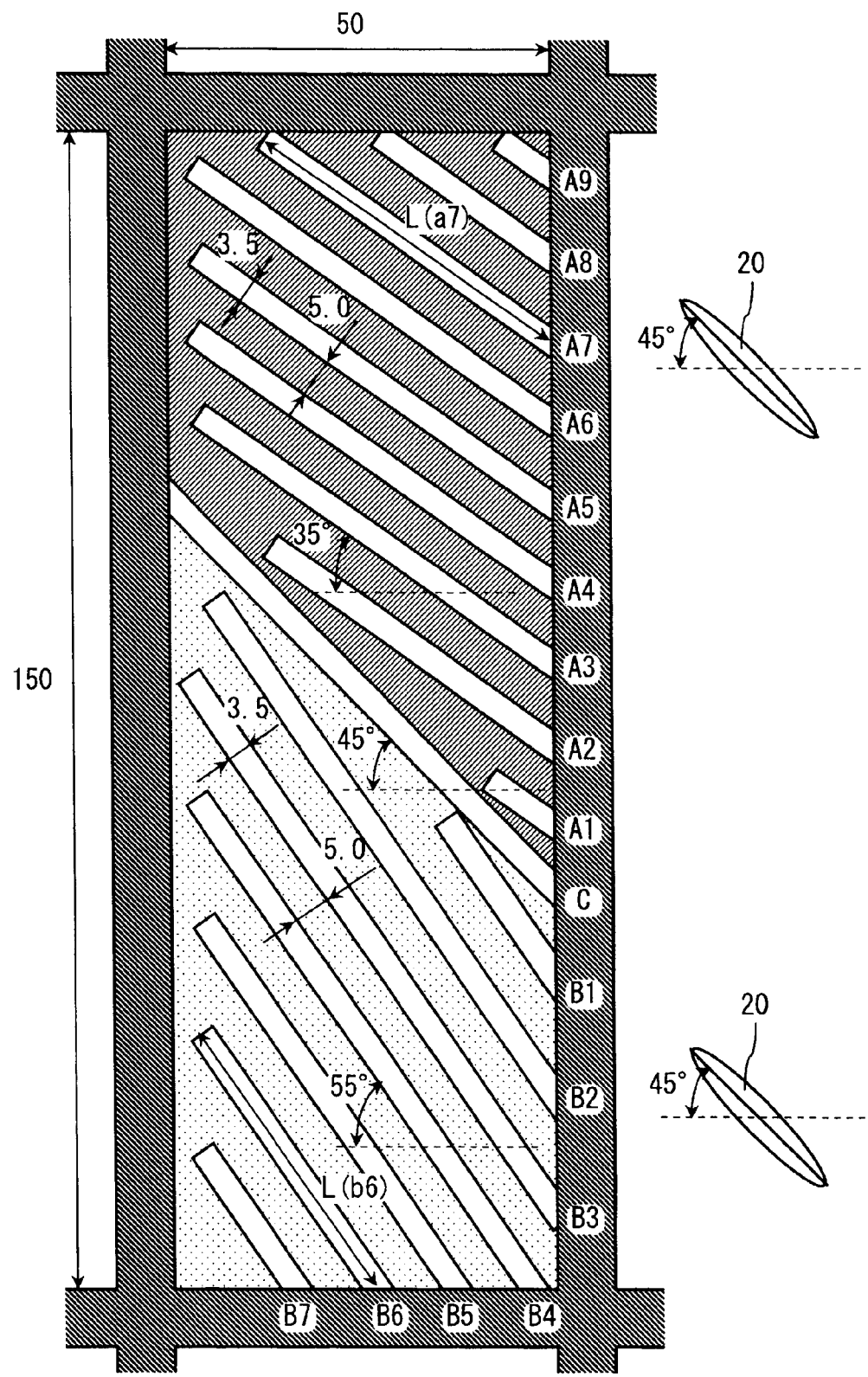
FIG. 6 is a view to describe a specific example of arrangement of slits according to an embodiment of the present invention.

A specific size of the slits A, B and C or the like is described hereinafter with reference to FIG. 6. FIG. 6 is a view to describe a specific example of arrangement of the slits A, B and C according to the embodiment. In FIG. 6, in the pixel 47 having an opening of 150 μm×50 μm, for example, the slit C at the angle α=45°, which is the same as the angle of the orientation (slow axis) of the liquid crystals 20, is made. In FIG. 6, the first region 81 above the slit C has nine slits A1 to A9, and the second region 82 below the slit C has seven slits B1 to B7. The slit width Wa of the slits A1 to A9 is 3.5 μm, and the interval Sa of the slits A1 to A9 is 5.0 μm. Likewise, the slit width Wb of the slits B1 to B7 is 3.5 μm, which is the same as Wa, and the interval Sb of the slits B1 to B7 is 5.0 μm, which is the same as Sa. In this manner, the slits A1 to A9 have the same slit width as the slits B1 to B7 in the example of FIG. 6. The angle of inclination +θ of the slits B1 to B7 with respect to the slit C is +10°, and the angle of inclination −θ of the slits A1 to A9 with respect to the slit C is −10°. Accordingly, as shown in FIG. 6, the slits B1 to B7 are inclined at an angle of 55° with respect to the extending direction of the gate line 43. On the other hand, the slits A1 to A9 are inclined at an angle of 35° with respect to the extending direction of the gate line 43.

Further, the respective slit lengths of the slits A1 to A9 and the slits B1 to B7 are adjusted in such a way that the total slit length L (A) of the slits A1 to A9 and the total slit length L(B) of the slits B1 to B7 satisfy L(A)=L(B)=360 μm. Specifically, the slit lengths of L(a1)=10 μm, L(a2)=28 μm, L(a3)=47 μm, L(a4)=56 μm, L(a5)=55 μm, L(a6)=55 μm, L(a7)=55 μm, L(a8)=44 μm and L(a9)=10 μm are set. Further, the slit lengths of L(b1)=22 μm, L(b2)=73 μm, L(b3)=77 μm, L(b4)=73 μm, L(b5)=57 μm, L(b6)=38 μm and L(b7)=20 μm are set.

Figure 7:
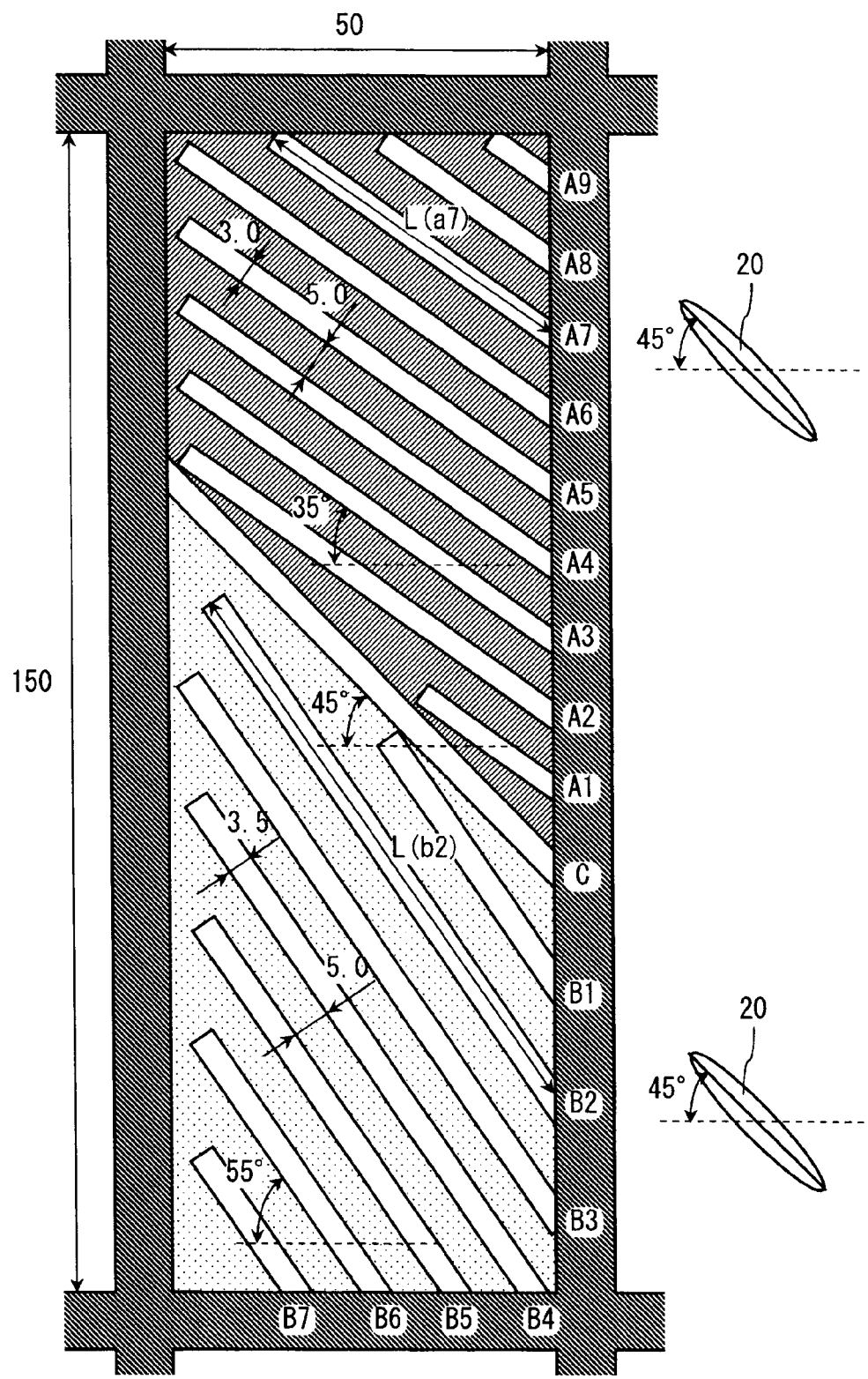
FIG. 7 is a view to describe another specific example of arrangement of slits according to an embodiment of the present invention.
Figure 8:
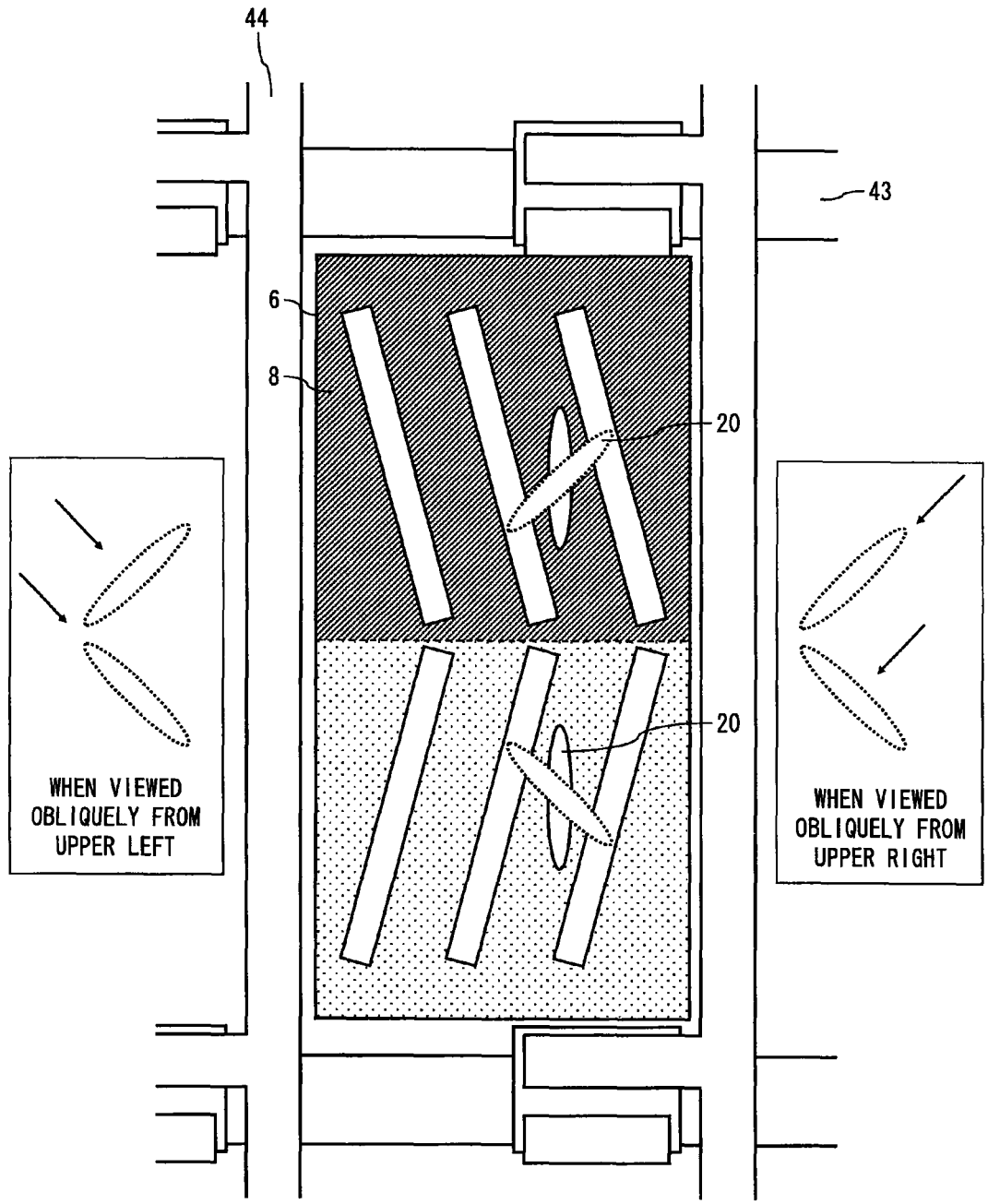
FIG. 8 is a plan view showing the pixel structure of a TFT array substrate in an FFS mode liquid crystal display device according to related art.

The slit width Wa of the slits A and the slit width Wb of the slits B may not be the same value. Thus, L(A)=L(B) may be satisfied by adjusting the slit width Wa of the slits A to be a different value from the slit width Wb of the slits B. In other words, the slit width Wa may be set differently from the slit width Wb so as to satisfy L(A)=L(B). FIG. 7 is a view to describe another specific example of arrangement of the slits A, B and C according to the embodiment. In FIG. 7, the respective slit lengths of the slits A1 to A9 and the slits B1 to B7 are adjusted in such a way that the total slit length L(A) of the slits A1 to A9 and the total slit length L(B) of the slits B1 to B7 satisfy L(A)=L(B)=380 μm.

Specifically, the slit lengths of L(a1)=9 μm, L(a2)=27 μm, L(a3)=43 μm, L(a4)=55 μm, L(a5)=56 μm, L(a6)=56 μm, L(a7)=57 μm, L(a8)=57 μm and L(a9)=20 μm are set. Further, the slit lengths of L(b1)=34 μm, L(b2)=74 μm, L(b3)=80 μm, L(b4)=74 μm, L(b5)=58 μm, L(b6)=29 μm and L(b7)=21 μm are set.

The size of the opening of the pixel 47 is 150 μm×50 μm, and the angle of inclination of the slit C is α=45°, which is the same as the angle of the orientation (slow axis) of the liquid crystals 20. The angle of inclination +θ of the slits B1 to B7 with respect to the slit C is +10°, and the angle of inclination −θ of the slits A1 to A9 with respect to the slit C is −10°. Further, the interval Sa of the slits A1 to A9 and the interval Sb of the slits B1 to B7 are both 5.0 μm. In such a case, it is preferred that the slit width Wb of the slits B1 to B7 is 3.5 μm, and the slit width Wa of the slits A1 to A9 is 3.0 μm, which is smaller than Wb.

As described above, the slits A1 to A9 have a different slit width from the slits B1 to B7 in the example of FIG. 7. Thus, in the case where L(A)=L(B) is not satisfied because either one of the first region 81 or the second region 82 is not large enough when the slit width Wa and the slit width Wb are fixed the same value, for example, it is possible to satisfy L(A)=L(B) by decreasing the slit width in the region that is not large enough or increasing the slit width in the region that is large enough. Further, in the case L(A)=L(B) is satisfied but the slits A or B are arranged unevenly in a part of the first region 81 or the second region 82, it is possible to arrange the slits evenly all over each region by increasing the slit width as appropriate. Generally, the slit widths Wa and Wb are preferably in the range of 2 to 10 μm.

Hereinafter, a method of manufacturing the liquid crystal display device according to an embodiment of the present invention is described. Firstly, a film made of Cr, Al, Ta, Ti, Mo, W, Ni, Cu, Au or Ag, an alloy film made mainly of those or a stacked film of those is deposited all over the transparent insulating substrate 10 such as glass. The film is formed all over the substrate 10 by sputtering or vapor deposition, for example. Next, a resist is applied thereon, and the applied resist is exposed to light through a photomask. The resist is then developed, thereby patterning the resist. This series of processes is referred to hereinafter as photolithography. After that, the film is etched using the resist pattern as a mask, thereby removing the photoresist pattern. The gate electrode 1 and the gate line 43 are thereby patterned.

Next, a first insulating layer to serve as the gate insulating layer 11, a material of the semiconductor layer 2 and a material of the ohmic contact layer are deposited in this order so as to cover the gate electrode 1 and the gate line 43. They are formed all over the substrate 10 by plasma CVD, atmospheric pressure CVD, low pressure CVD or the like, for example. Silicon nitride, silicon oxide or the like may be used as the gate insulating layer 11.

The material of the semiconductor layer 2 may be amorphous silicon, polycrystalline polysilicon or the like, for example. The material of the ohmic contact layer may be n-type amorphous silicon, n-type polycrystalline silicon or the like into which impurity such as phosphorus (P) is doped at high concentration, for example. After that, the layer to serve as the semiconductor layer 2 and the layer to serve as the ohmic contact layer are patterned into an island shape above the gate electrode 1 by the process of photolithography, etching and resist removal.

After that, in this embodiment, a film made of Cr, Al, Ta, Ti, Mo, W, Ni, Cu, Au or Ag, an alloy film made mainly of those or a stacked film of those is deposited to cover the layers formed above. The film is formed by sputtering or vapor deposition, for example. After that, the film is patterned by the process of photolithography, etching and resist removal, thereby forming the source electrode 4, the drain electrode 5 and the source line 44. Then, the layer to serve as the ohmic contact layer is etched using the source electrode 4 and the drain electrode 5 as a mask. Specifically, the part of the ohmic contact layer having an island shape which is not covered with the source electrode 4 or the drain electrode 5 is removed by etching. The semiconductor layer 2 having the channel region between the source electrode 4 and the drain electrode 5 and the ohmic contact layer are thereby formed.

Although the etching is performed using the source electrode 4 and the drain electrode 5 as a mask in this example, the etching of the ohmic contact layer may be performed using the resist pattern that is used when patterning the source electrode 4 and the drain electrode 5 as a mask. In this case, the ohmic contact layer is etched before removing the resist pattern on the source electrode 4 and the drain electrode 5.

After that, the second insulating layer 12 is deposited to cover the source electrode 4, the drain electrode 5 and the source line 44. For example, an inorganic insulating film such as silicon nitride or silicon oxide is deposited as the second insulating layer 12 all over the substrate 10 by CVD or the like. The channel region of the semiconductor layer 2 is thereby covered with the second insulating layer 12. Then, after depositing the second insulating layer 12, a contact hole that reaches the extending part of the drain electrode 5 is made in the second insulating layer 12 by the process of photolithography, etching and resist removal.

Then, a transparent conductive film such as ITO is deposited on the second insulating layer 12 all over the substrate 10 by sputtering or the like. The transparent conductive film is then patterned by the process of photolithography, etching and resist removal. The pixel electrode 6 that is connected to the drain electrode 5 through the contact hole is thereby formed.

Further, the third insulating layer 13 is deposited to cover the pixel electrode 6. For example, an inorganic insulating film such as silicon nitride or silicon oxide is deposited as the third insulating layer 13 all over the substrate 10 by CVD or the like. The pixel electrode 6 is thereby covered with the third insulating layer 13.

Furthermore, a transparent conductive film such as ITO is deposited on the third insulating layer 13 all over the substrate 10 by sputtering or the like. The transparent conductive film is then patterned by the process of photolithography, etching and resist removal. The common electrode 8 having a plurality of slits A, B and C lying in different directions is thereby formed opposite to the pixel electrode 6 with the third insulating layer 13 interposed therebetween. By the processes described above, the TFT array substrate according to the embodiment is completed.

On the TFT array substrate fabricated as above, an alignment layer is formed by the subsequent cell manufacturing process. Further, an alignment layer is formed also on a counter substrate that is fabricated separately. Then, an alignment process (rubbing process) is performed on the respective alignment layers so as to make micro scratches in one direction on contact surfaces with the liquid crystals 20. In this embodiment, the direction that is the same as or perpendicular to the longitudinal direction of the slit C made in the common electrode 8 on the TFT array substrate is the rubbing direction. The alignment layers having the alignment direction that is inclined at the angle α of inclination, where 0°<α<90°, with respect to the extending direction of the gate line 43 are thereby formed.

After that, a sealing material is applied to attach the TFT array substrate and the counter substrate together. After attaching the TFT array substrate and the counter substrate, the liquid crystals 20 are filled through a liquid crystal filling port by vacuum filling method or the like. The liquid crystal filling port is then sealed. The liquid crystals 20 are oriented in such a way that its orientation (slow axis) is in the same direction as the rubbing direction. Further, polarizing plates are attached to both sides of the liquid crystal cell that is formed in this manner. Finally, driving circuits are connected, and a backlight unit is mounted. At this time, the absorption axis of one of the polarizing plate 15 on the TFT array substrate side and the polarizing plate 25 on the counter substrate side is set to the direction perpendicular to the orientation direction (slow axis) of the liquid crystals 20, and the absorption axis of the other polarizing plate is set to the direction in parallel with the orientation direction (slow axis) of the liquid crystals 20. The liquid crystal display device according to the embodiment is thereby completed.

As described above, in this embodiment, the orientation direction (slow axis) of the liquid crystals 20 when no voltage is applied between the pixel electrode 6 and the common electrode 8 is at the angle α, where 0°<α<90°, with respect to the extending direction of the gate line 43. Therefore, the polarizing plates are placed in such a way that their absorption axes are perpendicular to or in parallel with the orientation direction (slow axis) of the liquid crystals 20. The optical axis of the transmitted light 30 that is transmitted from the liquid crystal display device is thereby different from the horizontal direction in which the absorption axis of the polarized sunglasses 35 is placed in both landscape and portrait positions. It is thereby possible to prevent a display from looking all black in either landscape or portrait position when looking at the display through the polarized sunglasses 35.

Further, the slits A and the slits B of the common electrode 8 are inclined at +θ or −θ with respect to the slit C that lies in the direction in parallel with or perpendicular to the orientation direction (slow axis) of the liquid crystals 20, so that the liquid crystals 20 operate symmetrically about the slit C. This prevents the birefringence effect in one pixel 47 area from varying depending on the angle of view. It is thereby possible to prevent color shift from occurring when viewing an image from different angles, and suitable viewing angle characteristics can be obtained. Further, there is no increase in thickness due to addition of a member unlike the techniques of Japanese Unexamined Patent Publications Nos. 10-10523 and 10-10522, thus allowing reduction in thickness of the liquid crystal display device. Furthermore, there is no decrease in contrast unlike when applying the technique of Japanese Unexamined Patent Publication No. 10-49082 to an FFS mode liquid crystal display device. Therefore, in this embodiment, it is possible to provide an FFS mode liquid crystal display device with high display quality that enables a display to be viewed in both landscape and portrait positions through polarized sunglasses without need of any additional member, and a method of manufacturing the same.

Although the liquid crystal display device including the channel-etch type TFT 50 is described in this embodiment, it may include another type of the TFT 50, such as a top-gate type.

Further, although the common electrode 8 is placed substantially all over the display area 41 except the slit parts, the present invention is not limited thereto. The shape of the common electrode 8 may be altered as appropriate as long as the plurality of slits A, the plurality of slits B and the slit C satisfy the above-described conditions. Further, although the case where the common electrode 8 having the slits is placed above the pixel electrode 6 with the third insulating layer 13 interposed therebetween is described by way of illustration, the present invention is not limited thereto. For example, the common electrode 8 may be placed below the pixel electrode 6 having the slits with an insulating layer interposed therebetween. In this case, the plurality of slits A, the plurality of slits B and the slit C are made in the pixel electrode 6. Thus, the slits A, B and C for generating a fringe electric field are made to satisfy the above-described conditions in either one of the pixel electrode 6 and the common electrode 8 that are placed opposite to each other with an insulating layer interposed therebetween.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device including a plurality of pixels, comprising:
    a first substrate having a thin film transistor;
    a second substrate placed opposite to the first substrate;
    liquid crystals filled between the first substrate and the second substrate;
    alignment layers respectively placed on surfaces of the first substrate and the second substrate in contact with the liquid crystals and having an alignment direction inclined at an inclination angle α where 0°<α<90° with respect to an extending direction of a gate line connected to a gate electrode of the thin film transistor;
    a pixel electrode placed in each of the plurality of pixels and connected to a drain electrode of the thin film transistor and a common electrode placed opposite to the pixel electrode with an insulating layer interposed therebetween, one of the pixel electrode and the common electrode having a slit for generating a fringe electric field to the liquid crystals with the other of the pixel electrode and the common electrode, the pixel electrode and the common electrode being placed on the first substrate; and
    a polarizing plate placed in the second substrate on a side opposite to the first substrate and having an absorption axis set in the alignment direction or a perpendicular direction to the alignment direction,
    wherein each of the plurality of pixels is divided into a first region and a second region by a boundary line that extends in the alignment direction or the perpendicular direction,
    wherein the slit comprises:
        a plurality of first slits placed in the first region on one side of the boundary line and inclined at an angle θ to a given direction with respect to a longitudinal direction of the boundary line, and
        a plurality of second slits placed in a second region on another side of the boundary line opposite to the first region and inclined at the angle θ to a direction opposite to the given direction with respect to the longitudinal direction of the boundary line, and
    wherein the angle θ is in a range of 1° to 20°.

2. The liquid crystal display device according to claim 1, wherein a total slit length of the plurality of first slits and a total slit length of the plurality of second slits have the same value.

3. The liquid crystal display device according to claim 1, wherein the plurality of first slits have the same slit width as the plurality of second slits.

4. The liquid crystal display device according to claim 1, wherein the plurality of first slits have a different slit width from the plurality of second slits.

* * * * *